A. G. BROWN.
MACHINE FOR MANUFACTURING INSULATING BOARDS FROM FIBROUS MATERIAL.
APPLICATION FILED JAN. 5, 1911. RENEWED JULY 6, 1915.
1,151,563.
Patented Aug. 31, 1915.
2 SHEETS—SHEET 1.
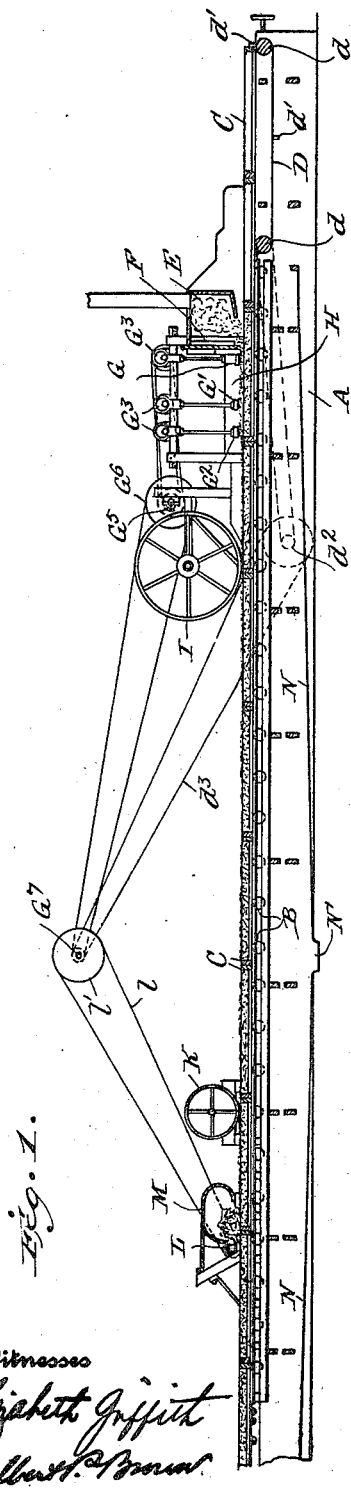
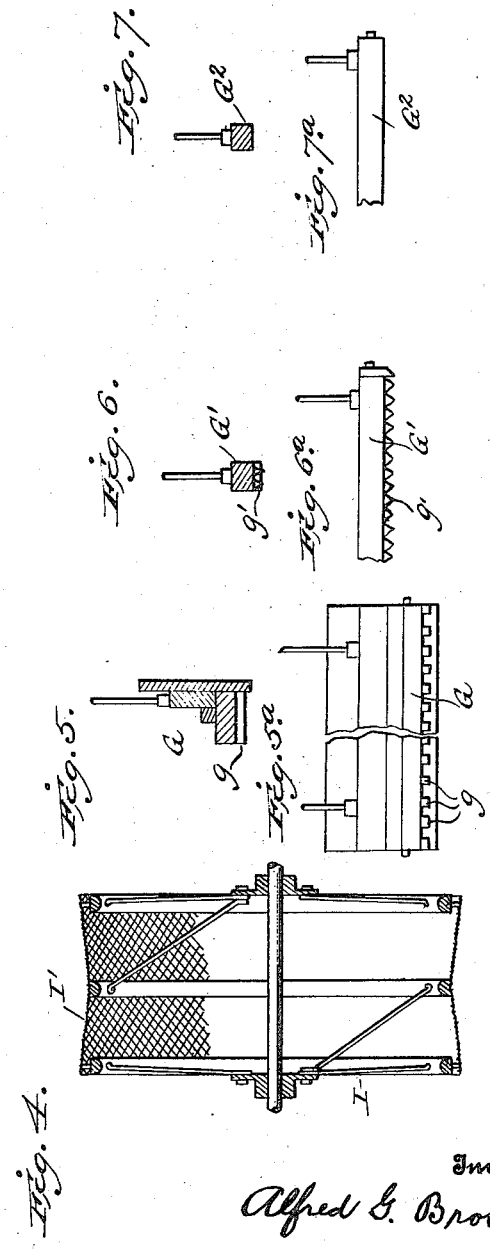

A. G. BROWN.
MACHINE FOR MANUFACTURING INSULATING BOARDS FROM FIBROUS MATERIAL.
APPLICATION FILED JAN. 5, 1911. RENEWED JULY 6, 1915.
1,151,563.
Patented Aug. 31, 1915.
2 SHEETS—SHEET 2.
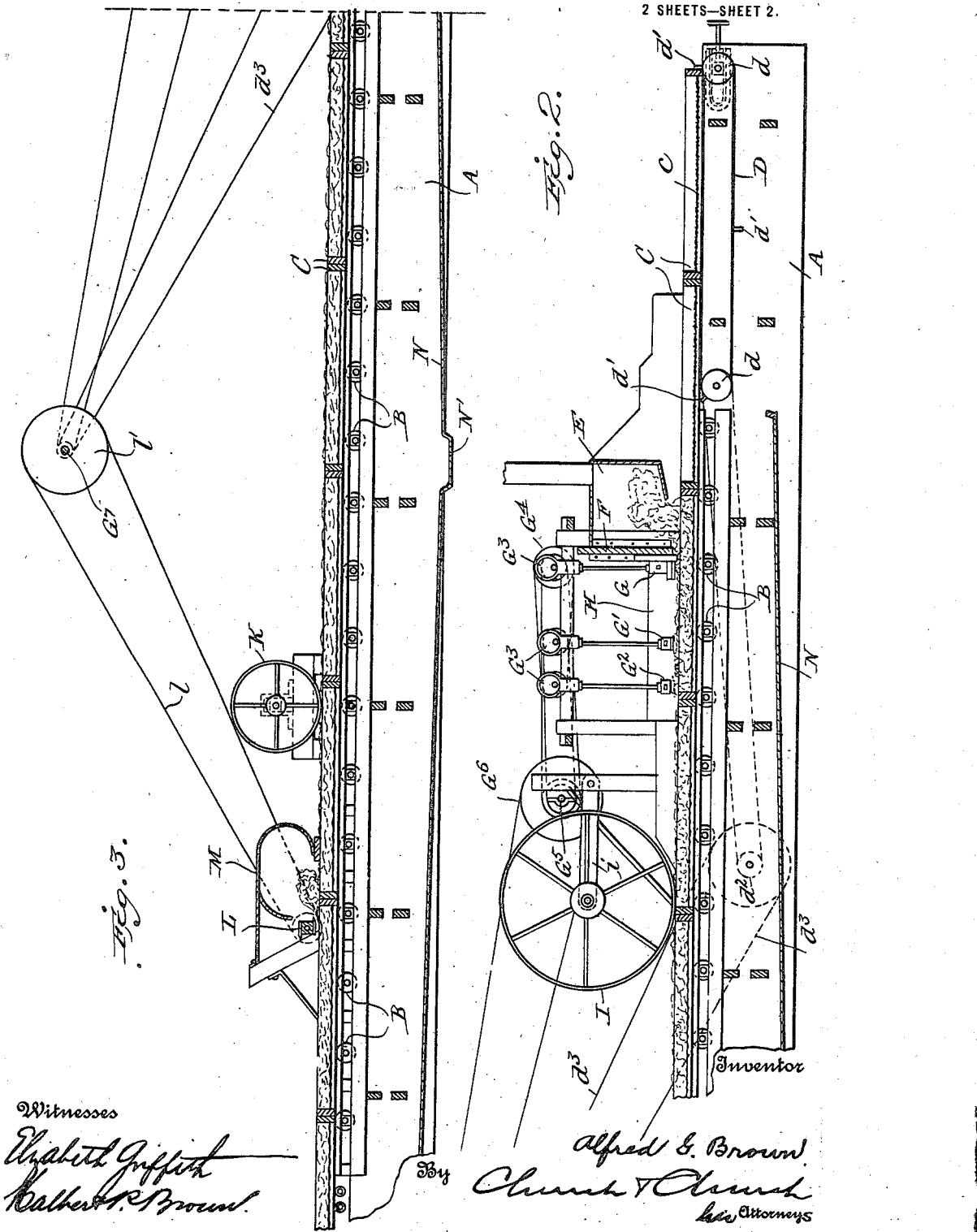

UNITED STATES PATENT OFFICE.

ALFRED G. BROWN, OF WINONA, MINNESOTA, ASSIGNOR TO UNION FIBRE COMPANY, OF WINONA, MINNESOTA, A CORPORATION OF MINNESOTA.

MACHINE FOR MANUFACTURING INSULATING-BOARDS FROM FIBROUS MATERIAL.

1,151,563.      Specification of Letters Patent.      Patented Aug. 31, 1915.

Application filed January 5, 1911, Serial No. 600,876. Renewed July 6, 1915. Serial No. 38,262.

*To all whom it may concern:*

Be it known that I, ALFRED G. BROWN, a citizen of the United States, residing at Winona, in the county of Winona and State of Minnesota, have invented certain new and useful Improvements in Machines for Manufacturing Insulating-Boards from Fibrous Materials, and I do hereby declare the following to be a full, clear, and exact description of the same, reference being had to the accompanying drawings, forming a part of this specification, and to the figures and letters of reference marked thereon.

This invention relates to machines adapted for the manufacture of coherent self-sustaining heat insulating boards from fibrous material, the fibers being entangled with each other and holding certain comminuted portions of the shives and wood-like material found in the plants from which the fiber is derived.

In the manufacture of boards of the character referred to, the materials from which the board is to be formed are reduced to the desired condition while wet or containing a large excess of moisture in the form of a free liquid which may be squeezed out or drained away.

In accordance with the present invention, the material in a wet mass, susceptible of being passed through chutes or ducts by gravity or pressure, is supplied to traveling forms, and while in the forms, subjected to mechanical treatment which will thoroughly distribute the same and cause the fibers to become intertangled. The moisture is removed, and as a final step before the complete drying of the mass, the upper portion is subjected to the action of a cutter whereby the surface is properly formed and the material remaining in the forms is reduced to a uniform thickness.

In the accompanying drawings,—Figure 1 is a diagrammatic sectional elevation showing a machine embodying the present improvement; Fig. 2 is a view corresponding to Fig. 1, but showing a portion of the right hand end only of the machine on an enlarged scale; Fig. 3 is a similar view showing the cutter and pressure cylinder immediately preceding the cutter; Fig. 4 is a sectional elevation of the primary pressure or squeezing cylinder; Figs. 5 and 5ª are details of the first tamper; Figs. 6 and 6ª are corresponding details of the second tamper; and Figs. 7 and 7ª are corresponding details of the third tamper.

Like letters of reference in the several figures indicate the same parts.

The machine illustrated, embodies a relatively long framing A, the particular construction of which is immaterial if built to embody longitudinal ways upon which a succession of forms may be made to travel. As illustrated, the ways in the framing are formed by a series of rollers B journaled in the frame and adapted to receive the bottom rails of a succession of forms C. The forms C are placed in position at the right hand end of the frame and are caused to travel in succession toward the left hand end, where they may be run into a drier or removed for subsequent treatment of the boards as will presently appear. For feeding or propelling the forms along the frame, a feeding mechanism embodying a belt D running over pulleys $d$ and having projections $d'$ thereon may be conveniently employed. The projections $d'$ are spaced apart, a distance corresponding to the length of one of the forms C, and the forwardly moving reach of the belt runs parallel with the ways which support the forms. Obviously the feeding belt may be relatively short, inasmuch as when each form is fed into position it will advance all of the forms which precede it, and for this reason the end faces of the forms are preferably made substantially flat to avoid any danger of a form being lifted off of the ways by pressure applied at the rear end.

The forms themselves are preferably provided with foraminous bottoms, as shown at $c$ in Fig. 2, and these foraminous bottoms may be conveniently made of rather course mesh wire cloth.

In their progress through the machine the forms C pass first beneath a feed chute E through which the prepared fibrous material is supplied, the opening from the chute being so arranged that the supply of material will be gaged to fill the forms in succession and provide a small surplus so as to insure a sufficient quantity in each form to permit of proper subsequent distribution, condensing and formation of the upper surface. There may be provided, if so desired, a gate F beneath which the material passes as the forms are fed forwardly, which gate may be adjustable or spring pressed, as shown, and will serve as a cut-off for preventing the feeding of more of the material than is necessary for the purposes stated. As the forms pass beyond the feed chute and gate the material is subjected to the action of a succession of tampers or distributers which will also operate to intertangle the fibers and condense the mass. The tampers are preferably reciprocatory, the first tamper G operating immediately adjacent the gate F and preferably having its operative face formed by a series of ribs or ridges $g$ extending in the direction of the feed of the material, as will be readily understood from inspection of figures 5 and 5ª. The third tamper G² has its operative face plane, as shown in Fig. 7, while the second tamper G' has its operative face formed by a multiplicity of teeth $g'$. The teeth may be conveniently formed so as to give the material either a forward, a backward, or a transverse pressure or distribution, depending upon the nature of the material employed, and the character of the board desired. In any event the tampers serve not only to distribute and even up the material in the forms, but also to condense and thoroughly intertangle the fibers while still in a very moist or wet condition. They also serve in a measure to discharge the water from the fiber downwardly through the foraminous bottom of the forms. The tampers may all be mounted on eccentrics G³ carried by suitable shafts adapted to be rotated by pulley and belt connections G⁴ with a pulley on a countershaft G⁵. The counter shaft G⁵ is driven by pulley and belt connection G⁶ extending to a pulley on a drive shaft G⁷.

While being subjected to the action of the tampers the fibrous material is prevented from escaping at the sides of the forms by stationary side guides H, and immediately beyond the point where the material is subjected to the action of the tampers there is located a pressure- or squeezing cylinder I preferably hung on arms $i$ and adapted to rest by gravity on the surface of the material contained in the forms and edges of the forms themselves. This pressure cylinder I is of sufficient weight to compress the material into the forms and to squeeze out a certain percentage of the water. It is preferably provided with a foraminous periphery I', Fig. 4, which foraminous periphery is of less diameter at the center than at the edges, whereby the top of the material is crowned upwardly at the center and portions at the edges of the forms pressed inwardly and downwardly so as to give the material a well rounded shape.

By making the periphery of the pressure roller or cylinder foraminous, the excess water in the material may escape up into the cylinder and flow off through the ends of the cylinder, as well as through the bottom of the foraminous forms. By this provision a very large proportion of the excess water may be eliminated.

After passing beneath the pressure cylinder the forms are allowed to travel a considerable distance before the material is again acted upon, during which time the water has ample time to drain away, leaving the fiber in a fairly compact and moisture-freed condition. In this condition it is passed beneath a second pressure roller K which is preferably mounted in adjustable bearings and has a flat face which travels directly upon or in immediate proximity to the upper edges of the forms, whereby the fibrous material will be further pressed into the forms and its top portion left in a substantially flat condition.

Owing to the character of the material acted upon and its elastic nature it is impossible to shape the top surface properly for the finished board by means such as that hereinbefore referred to, and with the object of providing means for shaping or smoothing the top surface, and also of reducing the material in the forms to a uniform thickness, there is provided in the present machine a cutter which will sever and remove from the surface of the material all portions which project above a height which corresponds to the thickness of the board desired, usually defined by the sides of the forms. This cutter is preferably in the form of a planer head L mounted on a shaft to rotate immediately above the forms, there being provided a guard or hood M for conducting the cuttings off to one side of the machine. The cutter head L is driven at high speed by a belt $l$ extending to a pulley $l'$ on the drive shaft G⁷, the speed being such as to insure the cutting away of the surplus material without disturbing or tearing the underlying fibers apart, thus the boards as they merge from the cutter will present a true surface, which will not necessarily require further finishing.

For driving the feeder D, the shaft of pulley $d$ at the inner end of the feeder may be belted to a small pulley $d^2$ journaled in the frame below the ways, and the pulley $d^2$ may be driven by a belt $d^3$ from the drive shaft G⁷, the arrangement being preferably such that the feeder will be given a relatively slow but powerful movement for advancing the forms through the machines.

In order to catch the water discharged and draining away from the fibrous material under treatment, a long water pan N is provided in the bottom of the frame which water pan may have a central discharge at N'.

With a machine such as herein described the manual labor required is reduced to a minimum, practically the only duties of the attendants being to place the forms in position at the entering end and to remove the filled forms at the discharge end of the machine. In operation the material gravitates through the supply chute, a proper gaged quantity being admitted to the forms as they successively pass beneath the chute. Each form in succession passes beneath the tampers, and the material therein is thoroughly intertangled and distributed uniformly to all parts of the form. Further progress of the forms brings the material beneath the foraminous pressure cylinder by which surplus water is squeezed out and the upper surface of the material given a rounded shape. In this condition the material is fed forwardly and allowed time to drain before passing beneath the final pressure cylinder, by which the surface is brought down into a substantially flat condition, and finally the forms pass beneath the rotary cutter, by which all surplus material is removed and the mass remaining in the forms reduced to a uniform thickness.

What I claim is:—

1. In an organized machine for manufacturing insulating boards of fibrous material carrying an excess of water, the combination with the ways, removable foraminous forms adapted to travel on the ways, and means for propelling the forms along the ways, of a supply chute opening into the forms on the ways, means for gaging the quantity of material supplied to each form from the chute, a succession of tampers adapted to coöperate with the material in the forms to distribute and intertangle the fibers, and a pressure roller coöperating with the upper surface of the material in the forms subsequent to the action of the tampers thereon, there being space below the forms for the escape of water from the forms during the tamping and pressing of the fiber.

2. In an organized machine for manufacturing insulating boards of fibrous material carrying an excess of water, the combination with the ways, removable foraminous forms adapted to travel on the ways, there being space below the forms for the escape of water and means for propelling the forms along the ways, of a supply chute opening into the forms on the ways, means for gaging the quantity of material supplied to each form from the chute, a succession of tampers coöperating with the material in the forms to distribute and interlock the fibrous material while the water is escaping from the forms, and a pressure roller having a foraminous periphery coöperating with the distributed material in the forms.

3. In an organized machine for manufacturing insulating boards of fibrous material, carrying an excess of water, the combination with the ways, removable foraminous bottom forms adapted to travel on the ways, there being space below the forms for the escape of water and means for propelling the forms along the ways, of a supply chute opening into the forms on the ways, means for gaging the quantity of material supplied to each form from the chute, tampers coöperating with the material in the forms to distribute and interlock the fibrous material, and means for applying pressure to the material to discharge excess moisture therefrom after the fiber has been distributed by the tampers.

4. In an organized machine for manufacturing insulating boards of fibrous material carrying an excess of water, the combination with the ways, removable foraminous forms adapted to travel on the ways, means for supplying fibrous material to and distributing the same in the forms on the ways there being space below the forms for the escape of water, and means for pressing said material down into the forms, of a cutter for cutting off the surplus distributed and pressed fibrous material from the top of the forms and reducing the material to a uniform thickness.

5. In an organized machine for manufacturing insulating boards of fibrous material carrying an excess of water, the combination with the ways, removable foraminous forms adapted to travel on the ways, and means for supplying material to and distributing the same in the forms on the ways there being spaces between the ways for the escape of water, of a rotary cutter located above the forms for cutting off surplus material and reducing the material to a uniform thickness in the forms.

6. In an organized machine for manufacturing insulating boards of fibrous material, the combination with the ways, foraminous forms adapted to travel on the ways, and means for supplying material to and distributing the same in the forms on the ways, of means for discharging excess moisture from the material, and a rotary cutter located above the forms in position to cut away the surplus fibrous material after excess moisture is discharged therefrom.

7. In a machine for manufacturing insulating boards of fibrous material, the combination with the ways, foraminous forms adapted to travel on the ways, means for supplying wet fibrous material to the forms and reciprocatory tampers for distributing the wet material in the forms, of a pressure cylinder for pressing down the material, and a cutter for severing the surplus material from the top of the material in the forms after the escape of the excess water.

8. In a machine for manufacturing insulating boards of fibrous material, the combination with the ways, foraminous forms adapted to travel on the ways, means for supplying wet fibrous material to the forms, reciprocatory tampers acting in succession on the material in the forms to distribute the same, and a pressure cylinder resting on the forms and material therein in rear of the tampers to squeeze out excess moisture, of a rotary cutter head overlying the forms and operating to cut off the surplus and reduce the material to a uniform thickness after the material is partially dried.

9. In a machine for manufacturing insulating boards of fibrous material, the combination with the ways, forms adapted to travel on the ways, means for supplying wet fibrous material to the forms, and reciprocatory tampers for distributing and condensing the material in the forms, of a pressure cylinder resting on the material in the forms and having a foraminous periphery of less diameter at the center than at the edges, and means for subsequently reducing the height of the material at the center of the forms.

ALFRED G. BROWN.

Witnesses:
O. N. Dean,
J. H. Bracken.